United States Patent
Dieling et al.

(10) Patent No.: US 8,240,722 B2
(45) Date of Patent: Aug. 14, 2012

(54) STOP ARMATURE FOR AIRCRAFT DOORS

(75) Inventors: Robert Dieling, Böhmfeld (DE); Volker Müncheberg, Kösching (DE); Dirk Trott, Donauwörth (DE)

(73) Assignee: Eurocopter Deutschland GmbH, Donauwörth (DE)

( * ) Notice: Subject to any disclaimer, the term of this patent is extended or adjusted under 35 U.S.C. 154(b) by 646 days.

(21) Appl. No.: 12/389,641

(22) Filed: Feb. 20, 2009

(65) Prior Publication Data

US 2010/0109346 A1 May 6, 2010

(30) Foreign Application Priority Data

Nov. 3, 2008 (DE) .................. 10 2008 055 666

(51) Int. Cl.
*E05C 19/06* (2006.01)

(52) U.S. Cl. .......... 292/90; 292/DIG. 15; 16/82; 16/85; 16/86 R

(58) Field of Classification Search ............ 292/90, 292/DIG. 15, 252; 16/82, 85, 86 A, 86 R
See application file for complete search history.

(56) References Cited

U.S. PATENT DOCUMENTS

| | | | | |
|---|---|---|---|---|
| 2,760,224 A | * | 8/1956 | Hennelly | 16/86 A |
| 2,813,293 A | * | 11/1957 | Civitelli | 16/375 |
| 2,933,754 A | * | 4/1960 | Winans | 16/42 R |
| 3,187,372 A | * | 6/1965 | Parsons | 16/375 |
| 3,219,374 A | * | 11/1965 | Snell | 292/15 |
| 3,701,557 A | * | 10/1972 | Centofante et al. | 292/251.5 |
| 4,852,919 A | * | 8/1989 | Nimee et al. | 292/251.5 |
| 5,241,725 A | * | 9/1993 | Hamatani et al. | 16/82 |
| 6,971,687 B2 | * | 12/2005 | Amy | 292/128 |
| 7,017,229 B2 | * | 3/2006 | Walcome | 16/82 |
| 7,536,746 B2 | * | 5/2009 | Rutledge et al. | 16/82 |

* cited by examiner

*Primary Examiner* — Carlos Lugo
*Assistant Examiner* — Mark Williams
(74) *Attorney, Agent, or Firm* — Brooks Kushman P.C.

(57) ABSTRACT

The invention relates to a stop armature of an armature system of an aircraft door with a fuselage stop armature (10) and a door stop armature (12, 79), with a stop screw (30; 40; 60) in one of the two stop armatures (10, 12 or 79), which can be pressurized by the other stop armature (10) in the longitudinal direction of the screw (30; 40; 60; 80) on a locating face (34; 52; 70; 88). It is further developed by virtue of the fact that the screw (30; 40; 60; 80) encompasses a screw head (32; 42; 69) with a ball (36; 50; 68; 85) held therein that can rotate around its midpoint (M) as the fulcrum. The invention also relates to a stop screw for a stop armature and the use of a ball thrust screw as the stop screw.

13 Claims, 4 Drawing Sheets

STOP ARMATURE FOR AIRCRAFT DOORS

Figure 1:
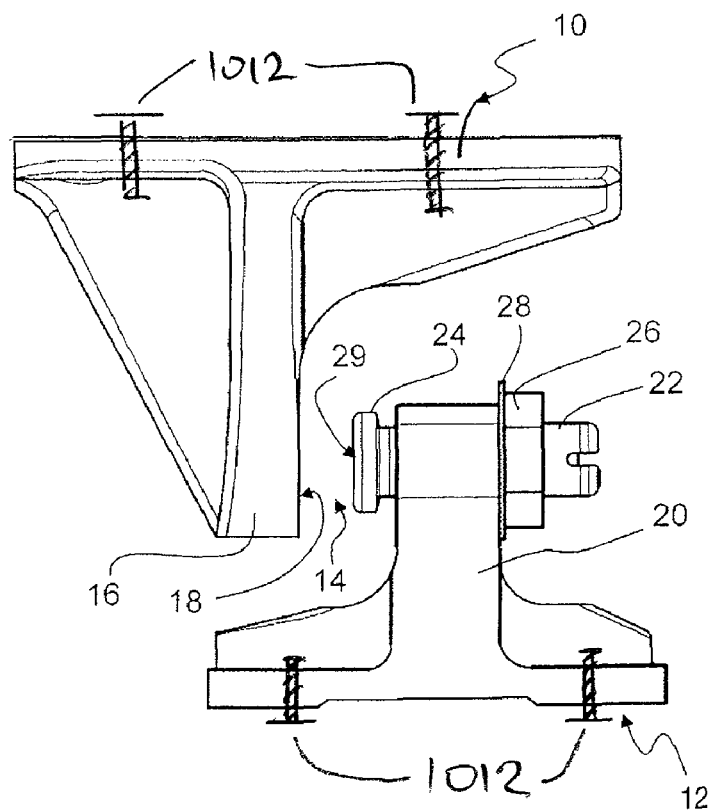

The invention relates to a stop armature of an armature system of an aircraft door with a stop armature on the door side and a stop armature on the fuselage side with a stop screw in one of the two stop armatures, which can be pressurized by the other stop armature in the longitudinal direction of the screw on a locating face. The invention also relates to a stop screw for such a stop armature, and the use of a ball thrust screw as the stop screw.

Aircraft doors are mounted on precisely defined contact points in a corresponding frame on the aircraft fuselage. Considerable compressive forces act on the contact points, arising from the difference between the internal cabin pressure and the outside pressure during a flight. In addition to being exposed to pressure, however, the door also is subject to movements relative to the fuselage. Aside from significant pressure, the contact points must hence withstand friction as well. However, the currently encountered deformations and loads have nearly pushed the limits of performance relative to the known coatings. Since future fuselage and door structures are increasingly being made out of composite materials, a further rise in deformations must be expected, and hence elevated frictional loads. In addition to higher-performance coatings on the one hand, an attempt was made on the other to meet these requirements via the geometric shape of the locating faces exerting pressure on the contact points.

It is known to design the contact points as stop armatures on the fuselage and door sides. The fuselage stop armature has a locating face that hits the screw head of a stop screw in the door stop armature while closing and locking the door. In order to enable a certain angular compensation, the essentially flat screw head is designed with a rounding-off radius of about 100 to 250 mm. This yields a somewhat large locating face, which still allows a certain angular compensation. The large locating face makes it possible to reduce the surface pressure on the screw head, so as not to overload either the screw head material or its coating.

The material comprising the stop screw is cured, stainless chromium-nickel-copper steel. The screw head is coated with an aluminum-bronze comprised of 90% copper, 9% aluminum and 1% iron to improve the surface slip characteristics and wear resistance. A basic adhesive agent consisting of 20% aluminum and 80% nickel is used to improve the adhesion of the coating to the steel surface. The coating is applied via flame spraying. The coating is subsequently oiled for about 10 minutes at 80 degrees Celsius to impart better surface slip characteristics and a lower adhesive wear. This makes it possible to achieve a surface roughness of the coating measuring about 0.4 mm at a layer thickness of about 1.4 mm. The frictional coefficient between a stop screw treated in this way and a locating face interacting with it on the fuselage stop armature measures about 0.15 to 0.2.

As an alternative, use is made of screws with a spherical head joint. The door contact surface is arranged on a moving joint section, which exhibits a convex bulge on the side opposite the contact surface. On the screw side, the convex bulge lies in a concave socket with the same radius as the fixed portion of the joint, and hence in the shaft of the stop screw. Given a large locating face, such a spherical head joint can be used to significantly reduce the surface pressure at the contact points. However, the structural design only permits a slight angular compensation of about 3 degrees. The intricate structural design also makes this component expensive.

Therefore, the object of the invention is to indicate a stop armature that satisfies the requirements for as low a surface pressure as possible on the one hand, and offers a high service life on the other, while leaving the other stop armature unchanged, and being cost-effective and not too heavy.

This object is achieved according to the invention for the stop armature mentioned at the outset by virtue of the fact that the screw encompasses a screw head with a ball held therein that can rotate around its midpoint as the fulcrum. Therefore, the invention initially follows the principle of reducing friction at the contact area between the stop armatures. The ball is mounted so that it can rotate in any direction, making it possible to abate a majority of friction from the relative movements between the door and fuselage stop armature as rolling friction. In additional, sliding friction continues to arise, specifically both between the ball and the screw head and between the ball and the locating face at the other stop armature. The spherical mounting of the locating face further enables an optimal angular compensation, which is structurally unrestricted. The angular compensation is also assisted by the spherical shape of the locating face itself.

Relatively high surface pressures can result from a locating face on the one stop armature on a ball with a small, structurally induced radius and an essentially flat locating face on the other stop armature. In another advantageous embodiment of the invention, the locating face of the ball can hence exhibit a certain flattened area with a larger radius, which as is known makes it possible to lower the surface pressure. The free rotation in the screw head is here left intact. In order to reduce the surface pressure even further if desired, the spherical head can exhibit an essentially flat locating face. However, the additionally spherical mounting of the locating face yields an angular compensation to a scope distinctly exceeding that of prior art.

In another advantageous embodiment of the invention, the stop armature can encompass a pot-shaped mount in the screw head for the ball with cylindrical lateral walls and a concavely bulged floor or a pan as the floor area. The diameter of the pot-shaped mount in the area of its cylindrical lateral walls essentially corresponds to the ball diameter. This gives rise to a linear, annular layout of the ball in the lateral walls. The rounding-off radius of the concave floor is greater than or equal to the ball diameter. As a result, the ball takes up a large amount of the floor area, so that the ball slides readily in the recess, and the ball is held stably in the mount.

The full effectiveness of the stop armature with flattened ball is only ensured if the flattened area can interact with the other stop armature as a locating face. To this end, it must be and remain aligned roughly parallel to the locating face on the other stop armature. In another advantageous embodiment of the invention, the stop armature can hence have an angular rotation limiter to restrict the rotational motion of the ball relative to the screw head. This makes it possible to avoid an undesired twisting of the ball, for example as the result of accidental touching with the door open during a loading process. The angular rotation limiter can consist of a blind hole in the floor area of the mount in the screw head, into which a journal on the ball extends, lying opposite the locating face relative to the midpoint of the ball. The diameter of the blind hole on the one hand and the dimensions of the journal on the other make it possible to stipulate a precisely defined, free turning area of the ball. It must be selected in such a way that the screw of the stop armature has a sufficient range of angular adjustment.

The expansive alignment capability of the ball-mounted locating face on the one stop armature opposite the accompanying locating face on the other stop armature combined with the size of the locating face itself already yields a relatively long service life for the stop armature. According to another advantageous embodiment of the invention, the service life can be increased even further by providing the locating face with a coating to reduce wear. The clearly enlarged locating face relative to an embodiment with a ball leads to a lower surface pressure, which is what even allows a plurality of technical and more cost-effective coatings in the first place.

In another advantageous embodiment of the invention, the ball can exhibit an integrated, disk-shaped part for enlarging the locating face.

In another advantageous embodiment of the invention, the stop screw can exhibit at least four grooves in the thread of a threaded section, which serve as a safeguard against twisting in conjunction with the stop screw and radially movable balls integrated therein.

For example, the threaded section has a spring-loaded pin, which is moved into the thread of the door stop armature while tightening the screw, as a result of which the balls are pressed into the stop screw, and, after the set position has been reached and the spring-loaded pin has returned to its original position, the balls project out of the stop screw to latch into the grooves.

For example, the screws are tightened in conjunction with activating the spring-loaded pin by means of a tool applied to the threaded section.

Possible coatings include dry lubricants, such as molybdenum sulfite, graphite or PTFE, lubricating lacquers, for example organic low-temperature lacquers or in particular organic high-temperature lacquers, and finally plastic layers like polyamide, PTFE or polyimides. Because the coating requires only a very small layer thickness, it can be applied in a vacuum-based coating process via physical gap-phase deposition (PVD). This makes it possible to generate layers of indium (In), silicon carbide (SiC), titanium carbide (TiC), tungsten carbide (WC), titanium nitrate (TiN) or molybdenum disulfite ($MOS_2$). All of these PVD layers possess a very good adhesion, wherein molybdenum disulfite additionally exhibits a very good slip behavior and high adhesive wear resistance.

As an alternative, thermochemical layers can be applied to the locating face, e.g., diffusion layers via case hardening, nitration layers or carbonitration layers. They provide a comparably acceptable slip behavior, while retaining a very good adhesive strength and high adhesive wear resistance. Consistently better slip behavior at a comparable adhesiveness and comparable wear resistance is provided by layers generated by chemical gas-phase deposition, for example those comprised of molybdenum disulfite ($MOS_2$), $B_4C$, NiB, PTFE, SiC, and others. Thermal spray layers, e.g., alloys, oxides or ceramics or mechanically resistant material layers, also offer consistently good adhesive wear resistance. If the latter are used as solid lubricants, they also provide good adhesiveness. In an advantageous embodiment of the invention, the locating face of the stop armature is hence furnished with a dry lubricant as the coating. WCCo+PTFE ("Teflon") proved to be particularly well suited. This plastic layer can be applied in a layer thickness of 0.08 mm, and exhibits a hardness of approx. 1000 HV. The low frictional resistance can be explained by virtue of the fact that the PTFE particles accumulate in the "valleys" of the carbides. Since Co is also sparingly soluble relative to titanium, which is generally used as the locating face on the other stop armature, and the PTFE layer represents a separating layer for the locating face, this plastic coating is distinguished by a low tendency toward adhesion by comparison to titanium.

As an alternative, a nickel-PTFE dispersion layer can be applied to the locating face of the stop screw. This layer consists of nickel and phosphorus, wherein the phosphorus content lies between 9 and 12%, and the PTFE content lies between approx. 20 and 30% v/v. The phosphorus content determines the hardness of the layer. The PTFE particles are rigidly and uniformly incorporated throughout the entire chemical nickel matrix, so that they cannot be rubbed off the surface as with a pure PTFE coating. This yields a particularly anti-adhesive surface, a very good dry lubrication and outstanding surface slip characteristics. It hardness measures about 230 HV, its frictional coefficient roughly between 0.1 and 0.2. The wear resistance of this coating can be increased even further by annealing the nickel-PTFE dispersion layer.

In another advantageous embodiment of the invention, the coating can consist of a CuNiIn coating. This coating can be fabricated in a layer thickness of 0.04 mm. The materials copper (Cu) and indium (In) exhibit a low solubility relative to titanium. In addition, indium is among the dry lubricants, and hence has a self-lubricating effect on the coating. Both the BCCo+PTFE layer and CuNiIn layer can be fabricated in the thermal plasma spraying process. The particles are here melted and remelted, and also oxidized in the process. The wear resistance of the coatings can also be increased further via cold-gas spraying. The particles without oxide formation are here accelerated to such an extent that the fuse together in the fringe range.

The plastic layers produce a favorable contact pairing for the contact surfaces of the two stop armatures made of metal and nonmetal. This pairing significantly reduces wear, because it exhibits an extremely low tendency toward adhesion.

The locating face on the flattened ball is directly in contact with the locating face on the other stop armature, and is not the only surface subject to friction owing to pressure exerted on the door and deformational movements of the aircraft fuselage. In another advantageous embodiment of the invention, the surface of the ball is provided with a diffusion layer, except for the locating surface. It is used to reduce the abrasive wear between the ball and mount as much as possible. It arises at those essentially annular contact surfaces where the ball abuts the cylindrical lateral walls of the mount on the one hand, and their floor area on the other. For example, the diffusion layer can consist of a case, nitrating layers or borating layers. What they share in common is that nonmetals like carbon or nitrogen, or semimetals like boron, silicon or even metals like aluminum or chromium, zinc, are incorporated into a substrate surface. This can take place in a gas, powder, bath or gas and plasma process.

The object mentioned at the outset is also achieved by a stop screw, in particular for a stop armature of an aircraft door of the type described above. To this end, it encompasses in particular a flattened ball, preferably with a twist safeguard, which essentially holds the flattened locating face perpendicular to the longitudinal or rotational axis of the screw. Their use and especially service life can be improved by providing the locating face with a dry lubricant as the coating to reduce wear. The remaining surface of the ball can also be provided with a suitable layer to largely reduce the abrasive wear between the ball and its mount in the stop screw.

Finally, the object mentioned at the outset is also achieved by using a ball thrust screw as the stop screw for the stop armature described in greater detail above.

Figure 2:
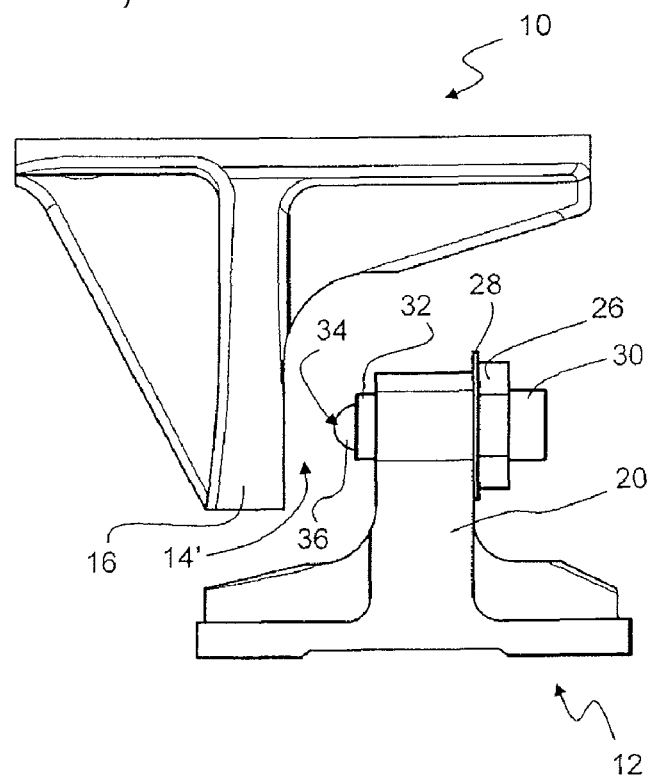
Figure 3:
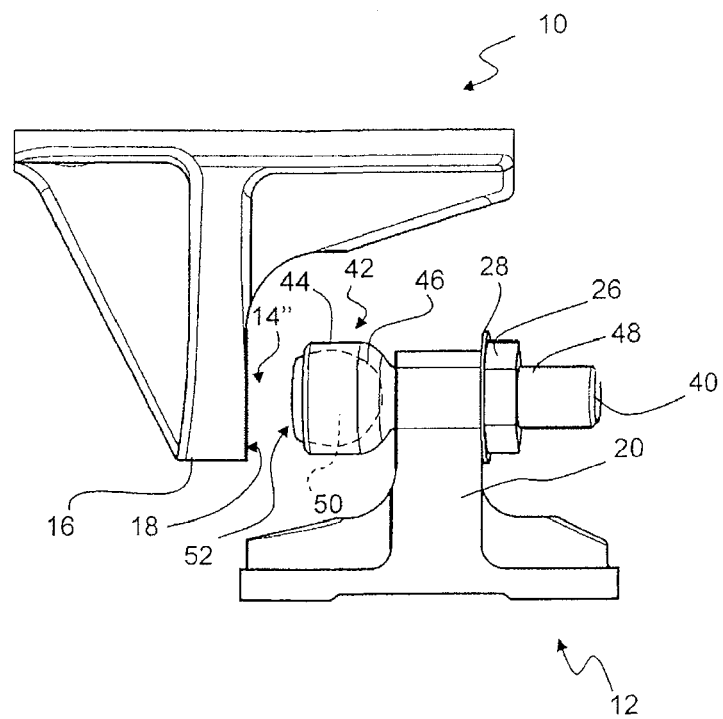
Figures 4, 5:
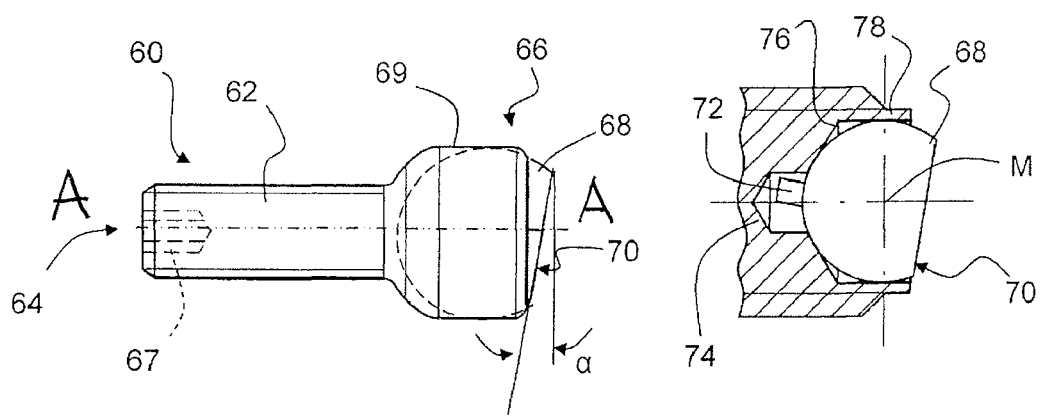

The principle of the invention will be explained by example in even greater detail below based on a drawing. The drawing shows:

FIG. 1: A side view of a stop armature according to prior art;

FIG. 2: A first embodiment of the invention with spherical screw head;

FIG. 3: A second embodiment with a convexly flattened ball in the screw head;

FIG. 4: A ball thrust screw with a flat spherical head; and

Figure 6:
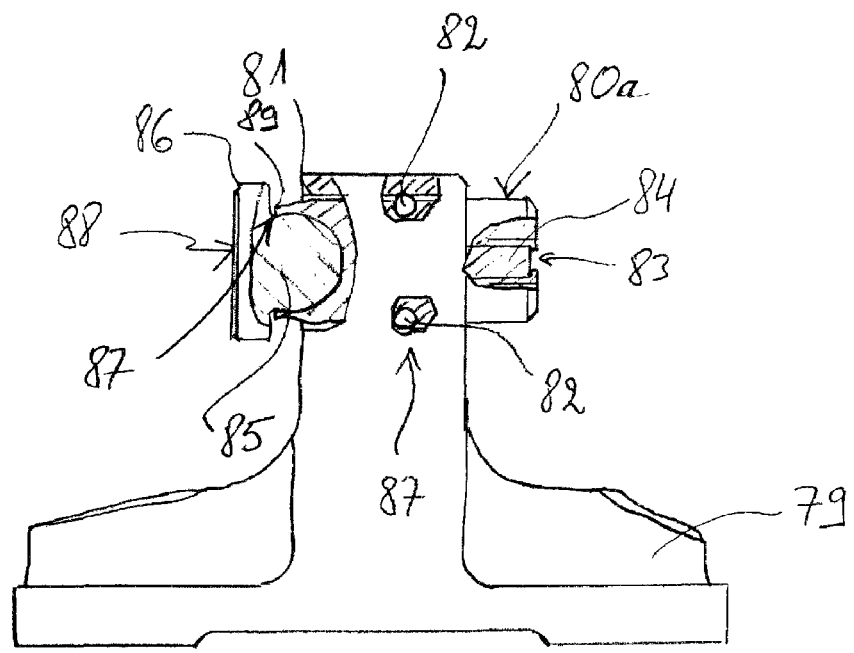
Figure 7:
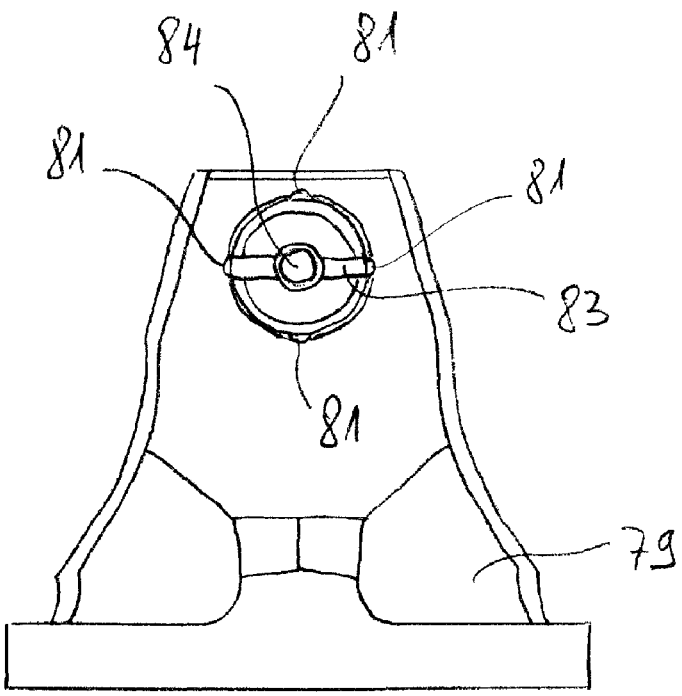
Figure 8:
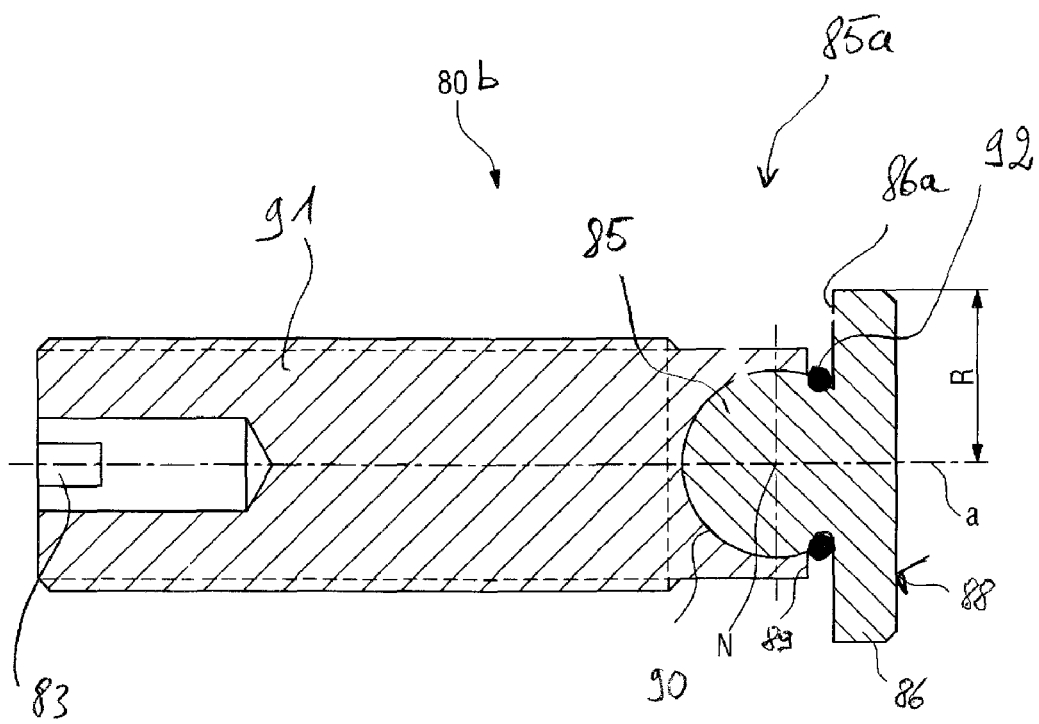

FIG. 5: A detailed section through a ball thrust screw;

FIG. 6: A third embodiment of the invention with angular rotation limiter;

FIG. 7: A side view of the embodiment in FIG. 6;

FIG. 8: A sectional view of another embodiment of the stop screw of the invention.

FIG. 1 illustrates prior art based on a known stop armature system for aircraft doors. The system consists of a fuselage stop 10 and a door stop 12, which are each bonded to the fuselage or door by securing means 1012 for example four screws. They abut each other in a contact area 14, which is formed by a fixed locating face 18 on the fuselage stop 10 at an arm 16 that projects perpendicular to the attachment plane.

The door stop 12 consists of a stop screw holder 20 that also projects at a right angle to the attachment plane, and is interspersed by a stop screw 22 with a screw head 24. The stop screw 22 is screwed into the screw holder 20, and is secured by a nut 26, which abuts the stop screw holder 20 via a lock washer 28 on the side opposite the screw head 24. The screw head 24 bears a locating surface 29, with which the door stop 12 abuts the fuselage stop 10.

By twisting the stop screw 22, the contact point between the fuselage stop 10 and door stop 12 can be fixed, and secured by tightening the nut. This makes it possible to establish a motion of the two stops 10, 12 relative to each other in the longitudinal direction of the screw. However, relative motions of the stops 10, 12 transverse to the longitudinal direction of the screw arise along with tilting movements during operation of the aircraft. These forces are transmitted in the contact areas 14 between the stop armatures 10, 12. In addition to a compressive load, the locating faces 18, 29 must hence also withstand significant frictional forces.

Since it is more easily replaced, in particular the stop screw 22 is designed with a specific level of wear in mind. This is because the fuselage stop 10 consists of a titanium-aluminum alloy ($Ti_6Al_4V$), and is milled out of a die-formed part. The locating face 18 is peened to impart a greater hardness to it. The locating face 18 is then ground and polished, so that it retains a surface roughness of 0.4 mm to 0.08 mm. Finally, the fuselage stop 10 is anodized in sulfuric acid to provide it with protection against corrosion.

The door stop armature 12 is also a milled die-formed part comprised of the mentioned titanium-aluminum alloy with corrosion protection. The stop screw 22 essentially consists of a stainless chromium-nickel-copper steel. The screw head 24 receives a spherical surface with a radius of 100 to 250 mm, so as to better balance out the tilting motion between the stops 10, 12. In order to achieve good slip characteristics and better wear resistance, it bears a coating made of aluminum-bronze, which encompasses 90% copper (Cu), 9% aluminum (Al) and 1% iron (Fe). It is applied to an adherent primer material, which brings about improved adhesion to the steel surface, and consists of 20% aluminum (Al) and 80% nickel (Ni). The coating is applied via flame spraying. To further improve the slip characteristics, the coating is oiled at approx. 80° for a period of about 10 minutes. This makes it possible to reduce adhesive wear. The surface roughness of the coating then measures 0.4 mm, and it slayer thickness 1.4 mm. These measures make it possible to lower the frictional coefficient between the stops 10, 12 to a value of 0.15 to 0.2.

These improvements already produced certain advances in particular relative to the wear resistance of the stop system. Therefore, one embodiment of the invention shown on FIG. 2 provides a different configuration of the contact area 14'. The depicted stop system only differs from the one on FIG. 1 in terms of the other configuration of the stop screw 30. Both the fuselage stop 10 and the door stop 12 are basically unchanged. By contrast, the stop screw 30 has a screw head 32, the locating face 34 of which is formed by a ball 36. It is rotatably mounted in the screw head 32, so that the locating face 18 of the stop 10 can be shifted into a plane perpendicular to the display plane relative to the door stop 12 with little friction. Hence, the friction in the contact area 14' is clearly diminished by comparison to the stop system on FIG. 1. As a result of the smaller rounding-off radius of the ball 36 relative to the screw head 24 from FIG. 1, the stop system according to FIG. 2 also offers a clearly better angular compensation. The lower spherical radius yields a smaller effective contact surface in the contact area 14' than in the stop system according to FIG. 1. This results in higher compression. Motion by the stops 10, 12 relative to each other generates both rolling friction and sliding friction in this embodiment. The rolling friction is caused by the ball 36 rolling onto the locating face 18 of the fuselage stop 10. Sliding friction only arises between the ball 36 and the screw head 32 holding it.

Another embodiment of a stop system is shown on FIG. 3. The stops 10, 12 are again unchanged, even the nut 26 and lock washer 28 exhibit no peculiarities. However, the stop screw 40 encompasses a specially designed screw head 42. It encompasses the cylindrical section 44 of a greater diameter facing away from the fuselage stop, and a spherical section 46 lying closer to the stop 12. In proximity to its crown, the spherical section 46 passes over into a threaded section 48 with a smaller diameter. The ball 50 accommodated in the cylindrical section 44 can rotate, and projects out of it. Its locating face 52 is convex, and provided with a larger rounding-off radius than that of the ball 50, so as to reduce the surface pressure between the locating faces 18, 52 in the contact area 14". This is because the pressure tapers off quadratically with the diameter of the locating face 52. Since the flattened ball 50 can twist by a small angle in the screw head 42, the locating face 52 can be tilted relative to the longitudinal axis A-A (FIG. 4) of the screw 40. However, the cylindrical section 44 of the screw head 42 limits the tilting range. It ends before an edge of the locating face 52 is lowered into the cylindrical section 44 of the screw head 42, and the locating face 18 hits it.

FIG. 4 presents a stop screw 60 similar to the stop screw 40 on FIG. 3, and can be used there in its place. It encompasses a cylindrical threaded section 62 with a mounting side 64 and a spherical side 66. The mounting side 64 provides a possible working point for a tool, specifically a standard hexagon opening 67 in place of a screw slit according to FIG. 1. A flattened ball 68 is rotatably mounted in the screw head on the face of the spherical side 66. Its flattened side exhibits a flat locating face 70, which projects out of the screw head 69, and stands perpendicular in a normal position on the longitudinal axis of the screw 60. As shown on FIG. 4, its ball 68 can be swiveled by an angle α of up to 9° relative to a flat initial position.

In this stop system, two flat locating faces 18, 70 meet in the contact area 14''''. Therefore, the compressive forces conveyed via the stops 10, 12 are distributed to relatively large locating faces 18, 70, so that a further reduced surface pressure exists there by comparison to FIG. 3. In addition, the stop screw 60 in conjunction with the locating face 70 offers a completely flat gliding surface. Since the locating face 70 can be tilted within a relatively wide range by the arrangement on the flattened ball 68, the stop screw 60 offers a good angular compensation. Given the low surface pressure in the contact area 14'', the locating face 70 can be provided with a plastic coating. Its advantage is that the contact pairing comprised of the metal locating face 18 and the then plastic-coated locating face 70 yields a slight tendency toward adhesion, which results in a longer service life of the stop screw 60 due to the lower wear.

FIG. 5 shows a safeguard against twisting for the ball 68 in the stop screw 60. To this end, the side of the flattened ball 68 lying opposite the locating face 70 exhibits a journal 72, which projects into a blind hole 74. The blind hole 74 proceeds from a concavely bulged floor of a spherical pan 76, the rounding-off radius of which exceeds that of the ball 68. It ensures the flattest abutment of the ball 68 in the pan 76, and hence provides for a good beveling. The pan 76 envelops a broad cylindrical lateral wall 78, which keeps the ball 68 at a right angle to the longitudinal axis of the screw in all directions. As a result, the ball 68 is mounted so that it can rotate around its midpoint M as the fulcrum. Given a deflection of the ball 68 by an angle α of greater than 9°, the journal 42 will hit the walls of the blind hole 74. Therefore, the safeguard against twisting ensures that the locating face 70 remains aligned essentially parallel to the locating face 18 of the fuselage stop. Otherwise, for example, it could be undesirably twisted by a careless passenger, who shifts it with a piece of luggage or shoe when entering or exiting the aircraft.

FIG. 6 and FIG. 7 present another embodiment of the door stop armature 79 and the stop screw 80a. As opposed to the stop 12, the door stop armature 79 exhibits at least four grooves 81 incorporated into the thread. These grooves 81 act in conjunction with the stop screw 80 and balls 82 integrated therein as a safeguard against twisting by the stop screw, eliminating the need for the groove 26 and locking plate 28. This embodiment operates based on a principle similar to that of a spherical locking bolt (self-latching).

When the tool is placed into the mounting slit 83 provided for this purpose, a spring-loaded pin 84 is pressed, so that the balls 82 can be pressed into the stop screw 80a while being screwed into the thread of the door stop armature 79. After the set position has been reached and the tool removed, the pin 84 is again returned to its original position, e.g., loaded by the spring, thereby pressing the balls 82 out of the stop screw 80a. Since several opposing grooves 81 are provided, the stop screw 80a can be set based on the angular adjustment and number of grooves 81, and then secured against twisting by latching in the balls 82.

The stop screw 80a shown on FIG. 6 is based on the same principle as the stop screw 60 depicted on FIG. 4, but has a contact element mounted direction in the threaded bolt that consists of a ball 85 and integrated laminar part 86 for enlarging the contact surface or locating face 88 relative to the fuselage stop 10. This contact surface can be provided with the coatings already mentioned at the outset. The laminar part 86 is also used in conjunction with an edge 89 of the spherical section of the screw head as an angular rotation limiter 87.

FIG. 8 shows a side view of the stops crew 80b. The stop screw 80b therein differs from the stop screw 80a according to FIG. 6 in that it lacks the safeguard against twisting shown on FIG. 6. The stop screw 80b also encompasses a ball 85, the midpoint N of which is rotatably held in a pan 90 in a screw shank 91. Instead of the locating face 70 according to FIGS. 4 and 5, the ball 85 bears a circular stop plate 86, whose radius R is greater than that of ball 85, and also than the radius of the shank 91 of the stop screw 80b. Therefore, the stop plate 86 extends over both the ball 85 and the shank 91 of the screw 80b in the side view of FIG. 8. This gives it a locating face 88 that is much larger than the locating face 70 of the stop screw 60 according to FIGS. 4 and 5. Of course, the larger locating face 88 further reduces the compressive forces that act there under a load, so that in particular plastic-based, lower-friction layers can be applied thereto.

The possible variants of the stop screw 80, 80a, 80b have an angular rotation limiter: The pan 90 holding the ball 85 passes over into an annular lateral wall 89 on the spherical side 85a of the screw 80b, which faces a rear side 86a of the stop plates 86. It forms a kind of stop against the rear side 86a once the ball 85 is inclined by more than the required angle relative to the longitudinal axis a of the stop screw. A desired or required angle of inclination can hence be set given the proper dimensioning of the annular lateral wall 89 and the rear side 86a of the stop plate 86. To more tightly limit the rotational angle, the lateral wall 89 can be drawn closer to the rear side 86a of the stop plate 86, for example, and cause the pan 90 to loop more around the ball 85 at the same time. To increase the angle, an opposite dimensioning can be selected for the lateral wall 89, or the stop plate 86 can be removed at the transition to the ball 85.

A gasket 92 can additionally be provided between the edge 89 and disk-shaped part 86 to protect the ball pan 90 against contamination, or as a reset element for the stop plate 86.

Since the above describes exemplary embodiments, the latter can be modified by an expert in the usual manner, without departing from the scope of the invention.

REFERENCE LIST

10 Fuselage stop
12 Door stop
14, 14', 14" Contact area
16 Arm
18 Locating face
20 Stop screw holder
22 Stop screw
24 Screw head
26 Nut
28 Lock washer
29 Locating face
30 Stop screw
32 Screw head
34 Locating face
36 Ball
40 Stop screw
42 Screw head
44 Cylindrical section
46 Spherical section
48 Threaded section
50 Flattened ball
52 Locating face
60 Stop screw
62 Threaded section
64 Mounting side
66 Spherical side
67 Hexagonal opening
68 Flattened ball
69 Screw head
70 Locating face
72 Journal
74 Blind hole
76 Pan
78 Lateral wall
79 Door stop
80, 80a, 80b Stop screw
81 Groove
82 Ball
83 Mounting slit 84 Pin
85 Ball
85a Spherical side
86 Disk-shaped part
87 Rotational angle limiter
88 Locating face
89 Edge, lateral wall
90 Pan
91 Shank
92 Gasket
α Tilting angle of ball 68
M Midpoint of ball 68

The invention claimed is:

1. A door stop system for an aircraft, said aircraft having a fuselage and a door mounted on the fuselage, the door stop system being provided with:
 a fuselage stop armature having securing means for said fuselage stop armature to be bonded on said fuselage of the aircraft
 a door stop armature having securing means for said door stop armature to be bonded on said door of the aircraft,
 a stop screw holder being held on one of the fuselage stop armature or door stop armature,
 a stop screw screwed in said stop screw holder extending in a longitudinal direction, said stop screw having a locating face for contact with the fuselage stop armature or the door stop armature other than the door stop armature or the fuselage stop armature that holds the screw wherein
 the stop screw includes a screw head having an inner cylindrical lateral wall forming a concave pan;
 said door stop system further including a ball defining a midpoint (M) as a fulcrum;
 said ball having a smaller rounding off radius relative to the cylindrical lateral wall of the screw head;
 said ball being rotatably-mounted in the concave pan of the stop screw, so as to rotate around said midpoint (M), said midpoint (M) being encompassed by said cylindrical lateral wall of the concave pan;
 said ball including a projecting portion that partly projects in the longitudinal direction out of the cylindrical lateral wall;
 the locating portion being fixed to the projecting portion of the ball, so that the locating face can be tilted by a swiveling angle (α) together with the ball; and
 the door stop system further including abutment means so that the swiveling angle (α) is up to 9 degrees.

2. The stop system according to claim 1, wherein the locating face has an essentially convex area.

3. The stop system according to claim 2, wherein the stop screw has a longitudinal end proximal to the locating face while the abutment means comprise a rotational angle limiter, mounted in the longitudinal direction between the locating face and the longitudinal end of the stop screw for limiting rotational motion of the ball relative to the stop screw.

4. The stop system according to claim 3, wherein the rotational angle limiter comprises a journal mounted on the stop ball and a blind hole formed into the screw head, the journal extending into the blind hole.

5. The stop system according to claim 1, wherein the locating face has an essentially planar area.

6. The stop system according to claim 1, wherein the screw head comprises a cylindrical section on an inner cylindrical lateral wall, the ball being held partly inside the cylindrical section on said inner cylindrical lateral wall and the projecting portion of the ball has an integrated disk-shaped part extending laterally with respect to said longitudinal direction from the cylindrical section on the inner cylindrical lateral wall so as to enlarge the locating face.

7. The stop system according to claim 1, wherein the screw head forms an inner cylindrical lateral wall and an inner concavely bulged floor area, the inner cylindrical lateral wall and the inner concavely bulged floor area defining a pot-shaped mount for the ball which is partly held into said pot-shaped mount.

8. The stop system according to claim 7, further comprising a wear reducing coating that is applied upon the locating face of the ball.

9. The stop system according to claim 8, wherein the wear reducing coating is a dry lubricant.

10. The stop system according to claim 1, wherein the abutment means comprise a rotational angle limiter arranged inside the concave pan between the ball and the screw head for limiting rotational motion of the ball relative to the screw head.

11. The stop system according to claim 1, wherein the ball comprises an outer diffusion surface arranged inside the concave pan, said outer diffusion surface of the ball being provided with a diffusion layer, the location face being free from said diffusion layer.

12. The stop system according to claim 10, wherein the rotational angle limiter comprises a laminar part on the stop ball and an edge, the edge being on a spherical section of the screw head.

13. The stop system according to claim 1, wherein the stop screw has a threaded section, said threaded section having at least four grooves extending in said longitudinal direction, radially movable balls being integrated into said grooves, the threaded section serving as a safeguard against twisting in conjunction with the stop screw.

* * * * *